United States Patent
Zeng

(10) Patent No.: US 10,788,796 B2
(45) Date of Patent: Sep. 29, 2020

(54) AUTOMATIC TIME ZONE UPDATING METHOD AND SYSTEM FOR BLUETOOTH WATCH

(71) Applicant: HuiZhou TCL Mobile Communication Co., Ltd., HuiZhou (CN)

(72) Inventor: Peng Zeng, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 300 days.

(21) Appl. No.: 15/748,553

(22) PCT Filed: Dec. 2, 2016

(86) PCT No.: PCT/CN2016/108357
§ 371 (c)(1),
(2) Date: Jan. 29, 2018

(87) PCT Pub. No.: WO2017/185749
PCT Pub. Date: Nov. 2, 2017

(65) Prior Publication Data
US 2018/0253067 A1    Sep. 6, 2018

(30) Foreign Application Priority Data
Apr. 25, 2016 (CN) .......................... 2016 1 0259178

(51) Int. Cl.
*G04G 9/00*     (2006.01)
*H04W 4/029*    (2018.01)
*H04W 4/80*     (2018.01)
*H04W 4/02*     (2018.01)

(52) U.S. Cl.
CPC .......... *G04G 9/0076* (2013.01); *H04W 4/026* (2013.01); *H04W 4/029* (2018.02); *H04W 4/80* (2018.02)

(58) Field of Classification Search
CPC ........................ G04G 9/0076; G04R 20/26–30
See application file for complete search history.

(56) References Cited

U.S. PATENT DOCUMENTS

| | | | |
|---|---|---|---|
| 2009/0219205 A1* | 9/2009 | Jazra | G01S 19/25 342/357.64 |
| 2010/0265802 A1* | 10/2010 | Lai | G04R 20/06 368/47 |
| 2014/0149560 A1* | 5/2014 | Hakami | H04L 67/1095 709/221 |
| 2015/0362893 A1 | 12/2015 | Masserot et al. | |

(Continued)

FOREIGN PATENT DOCUMENTS

| CN | 1725765 A | 1/2006 |
|---|---|---|
| CN | 101387864 | 3/2009 |

(Continued)

*Primary Examiner* — Edwin A. Leon
*Assistant Examiner* — Jason M Collins

(57) ABSTRACT

A method and system for automatically updating a current time zone of a smart watch by using the smart watch to acquire longitude and latitude data corresponding to a current location of the smart watch and to provide the longitude and latitude data to a mobile terminal to generate time zone information that is then provided to the smart watch.

20 Claims, 2 Drawing Sheets

(56) References Cited

U.S. PATENT DOCUMENTS

| | | | |
|---|---|---|---|
| 2016/0021501 A1* | 1/2016 | Sambongi | H04W 4/021 455/456.3 |
| 2016/0050531 A1* | 2/2016 | Choi | H04W 4/027 455/456.2 |
| 2017/0075551 A1* | 3/2017 | Robinson | G06F 3/04883 |
| 2017/0123382 A1* | 5/2017 | Ruzicka | H04W 4/021 |
| 2019/0072913 A1* | 3/2019 | Iwamiya | G04R 20/06 |

FOREIGN PATENT DOCUMENTS

| | | |
|---|---|---|
| CN | 101754367 A | 6/2010 |
| CN | 101867867 | 10/2010 |
| CN | 101867867 A | 10/2010 |
| CN | 103076738 | 5/2013 |
| CN | 103809427 | 5/2014 |
| CN | 103995461 A | 8/2014 |
| CN | 04503221 A | 4/2015 |
| CN | 104503220 A | 4/2015 |
| CN | 104507046 | 4/2015 |
| CN | 204406058 | 6/2015 |
| CN | 105446130 A | 3/2016 |
| CN | 105911860 A | 8/2016 |
| JP | 2005351674 A | 12/2005 |

* cited by examiner

AUTOMATIC TIME ZONE UPDATING METHOD AND SYSTEM FOR BLUETOOTH WATCH

FIELD OF THE INVENTION

The present invention relates to the field of smart watches, and in particular to an automatic time zone updating method and system for a Bluetooth watch.

BACKGROUND

Along with the rapid development of Bluetooth wearable devices, smart watches have experienced an explosive growth over recent years. As time passes by, however, functions on smart watches become increasingly similar. Right now, smart watches are unable to meet various demands of clients. For example, smart watches do not have functions to update the time zone of the watches other than synchronizing the time zone with a mobile terminal. In such a situation, a mobile terminal needs to be able to determine the current time zone in real time, and only then can it enable a smart watch to promptly update the time zone. However, it is important that a smart watch be able to display a correct time zone at any time and at any location. However, previous smart watches do not have such a function. Therefore, the prior art needs to be further improved.

SUMMARY

This deficiency of known smart watches can be overcome by providing a smart watch that determines its own position, and then send the acquired longitude and latitude data to a mobile terminal that sends the longitude and latitude data to a network server. The network server obtains time zone data and then returns the time zone data to the mobile terminal, which then updates the smart watch.

In an exemplary implementation, an automatic time zone updating method for a smart watch comprises: the smart watch sends longitude and latitude data acquired through its own real-time positioning to a paired mobile terminal; the mobile terminal encapsulates the longitude and latitude data, and sends the longitude and latitude data to a network server through a network; the network server analyzes the received longitude and latitude data, and returns time zone data to the mobile terminal, wherein the time zone data is JSON data; the mobile terminal parses the time zone data to obtain corresponding time zone information, sends the corresponding time zone information to the paired smart watch via Bluetooth, and at the same time, updates the mobile terminal's own time zone; and the smart watch updates, upon receiving the time zone information, the smart watch's own time zone.

In an exemplary implementation, before the smart watch sends longitude and latitude data acquired through its own real-time positioning to a paired mobile terminal, the method further comprises: connecting the smart watch and the mobile terminal via Bluetooth.

In an exemplary implementation, the smart watch sends longitude and latitude data acquired through its own real-time positioning to a paired mobile terminal comprises: the smart watch activates its GPS positioning module; the smart watch acquires, in real-time, longitude and latitude data thereof through the GPS positioning module; and the smart watch sends the longitude and latitude data to a paired mobile terminal via Bluetooth.

In an exemplary implementation, the network server is a Google server.

In an exemplary implementation, the Google server has a time zone positioning service, said time zone positioning service being a service that acquires time zone data of a corresponding position according to the longitude and latitude data.

In an exemplary implementation, when a position corresponding to the longitude and latitude data is a region on the open sea, the time zone data is null.

In an exemplary implementation, an automatic time zone updating method for a smart watch comprises: the smart watch sends its own longitude and latitude data to a paired mobile terminal; the mobile terminal encapsulates the longitude and latitude data, and sends the longitude and latitude data to a network server through a network; the network server analyzes the received longitude and latitude data, and returns time zone data to the mobile terminal; the mobile terminal parses the time zone data to obtain corresponding time zone information, and sends the corresponding time zone information to the paired smart watch via Bluetooth; and the smart watch updates, upon receiving the time zone information, the smart watch's own time zone.

In an exemplary implementation, the time zone data is JSON data.

In an exemplary implementation, before the smart watch sends its own longitude and latitude data to a paired mobile terminal, it further comprises: connecting the smart watch and the mobile terminal via Bluetooth.

In an exemplary implementation, the smart watch sends its own longitude and latitude data to a paired mobile terminal comprises: the smart watch activates its GPS positioning module; the smart watch acquires longitude and latitude data thereof through the GPS positioning module; and the smart watch sends the longitude and latitude data to a paired mobile terminal via Bluetooth.

In an exemplary implementation, the network server is a Google server.

In an exemplary implementation, the Google server has a time zone positioning service, said time zone positioning service being a service that acquires time zone data of a corresponding position according to the longitude and latitude data.

In an exemplary implementation, when a position corresponding to the longitude and latitude data is a region on the open sea, the time zone data is null.

In an exemplary implementation, an automatic time zone updating system for a smart watch comprises: a longitude and latitude data sending module configured to send the smart watch's own longitude and latitude data to a paired mobile terminal; a longitude and latitude data encapsulating module configured to encapsulate the longitude and latitude data received by the mobile terminal, and send the longitude and latitude data to a network server through a network; a longitude and latitude data analyzing module configured to analyze the longitude and latitude data received by the network server, and return time zone data to the mobile terminal; a time zone data parsing module configured to parse the time zone data received by the mobile terminal to obtain corresponding time zone information, and send the corresponding time zone information to the paired smart watch via Bluetooth; and a time zone updating module configured to update, upon receiving the time zone information by the smart watch, the smart watch's own time zone.

In an exemplary implementation, the time zone data is JSON data.

In an exemplary implementation, the automatic time zone updating system for a smart watch further comprises: a connecting module configured to connect the smart watch with the mobile terminal via Bluetooth.

In an exemplary implementation, Preferably, the longitude and latitude data sending module comprises: a GPS activating unit configured to activate its GPS positioning module; and a longitude and latitude data acquiring unit configured to acquire longitude and latitude data of the smart watch through the GPS positioning module; a longitude and latitude data sending unit configured to send the longitude and latitude data to a paired mobile terminal via Bluetooth.

In an exemplary implementation, the network server is a Google server.

In an exemplary implementation, the Google server has a time zone positioning service, said time zone positioning service being a service that acquires time zone data of a corresponding position according to the longitude and latitude data.

In an exemplary implementation, when a position corresponding to the longitude and latitude data is a region on the open sea, the time zone data is null. Thus, even in the case where a mobile terminal is unable to learn the current time zone, it can still acquire, in real time, the time zone information for updating, thereby greatly facilitating the use by a user and adding a new function to smart watches.

DETAILED DESCRIPTION

The present invention will be further described in detail below. It should be understood that the specific embodiments described herein are only used to explain the present invention, instead of limiting the present invention.

Figure 1:
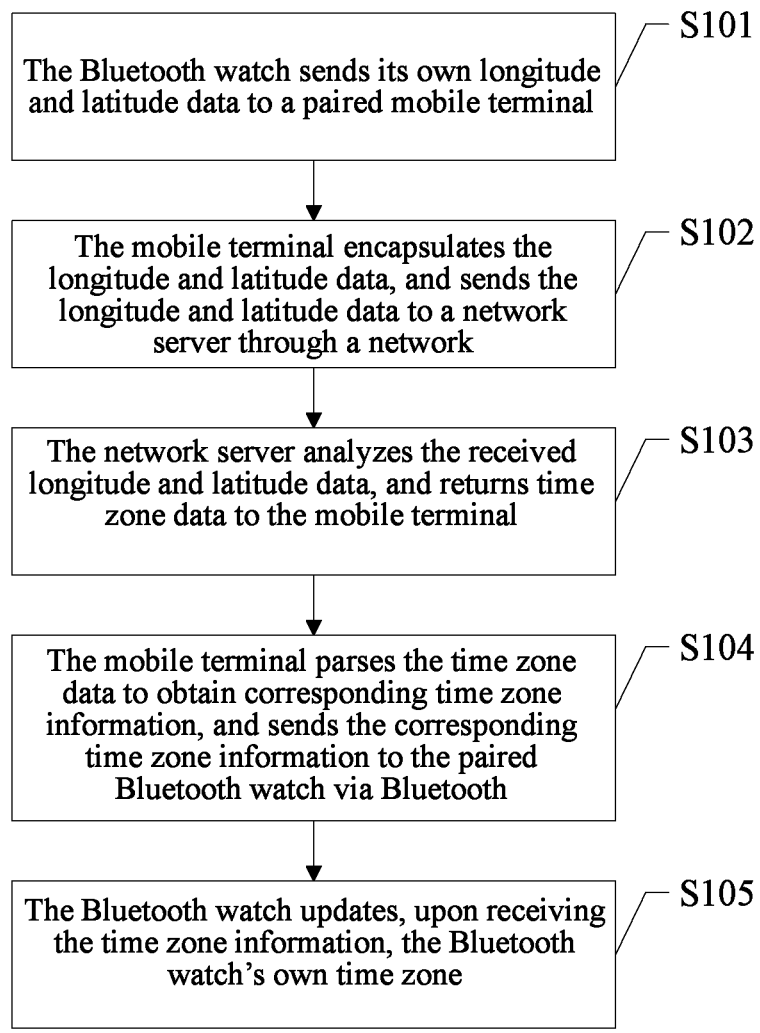
FIG. 1 is a flow chart showing an exemplary automatic time zone updating method for a smart watch.

FIG. 1 shows an exemplary automatic time zone updating method for a smart watch.

Prior to S101, the smart watch connects to a mobile terminal via Bluetooth. Bluetooth provides a fast data transmission rate, stable transmission over a short distance, and a low standby power consumption.

At S101, the smart watch sends longitude and latitude data corresponding to a current location of the smart watch to the mobile terminal using Bluetooth.

At S102, the mobile terminal encapsulates the longitude and latitude data, and sends the longitude and latitude data to a network server through a network.

At S103, the network server analyzes the received longitude and latitude data, and returns time zone data to the mobile terminal.

At S104, the mobile terminal parses the time zone data to obtain time zone information, and sends the time zone information to the smart watch via Bluetooth.

At S105, the smart Bluetooth watch updates its own time zone information based on the time zone information received from the mobile terminal.

Therefore, an exemplary smart watch performs real time positioning, and sends the longitude and latitude data acquired through positioning to a mobile terminal. The mobile terminal sends the longitude and latitude data to a network server, and the network server obtains time zone data through analysis and then returns the time zone data to the mobile terminal. The mobile terminal parses the time zone data to obtain a corresponding time zone, and sends the time zone to the smart watch for updating. In such a way, even in the case where a mobile terminal is unable to update its time zone information in real time, the smart watch can still update its own time zone information, and at the same time, the mobile terminal can update its own time zone information.

Figure 2:
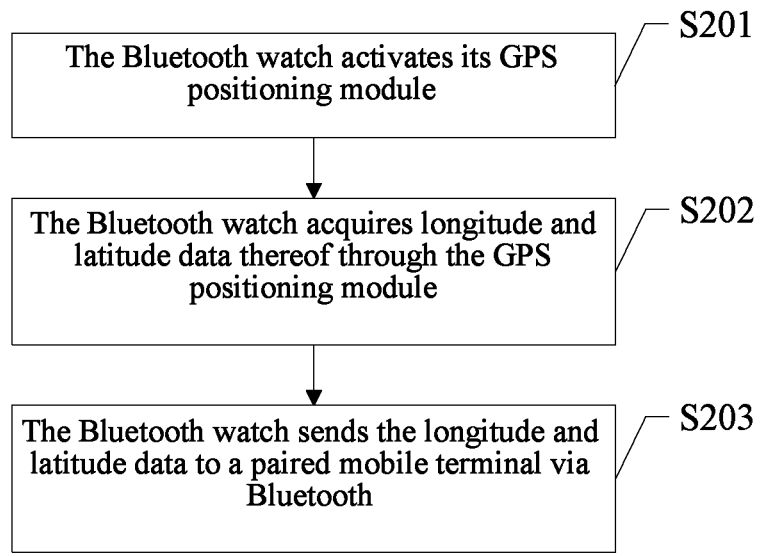
FIG. 2 is a flow chart further illustrating S101 of FIG. 1.

FIG. 2 is a flow chart further illustrating S101 of FIG. 1.

In S201, the smart watch activates a GPS positioning module of the smart watch. The GPS positioning module can be, for example, a GPS positioning chip.

In S202, the smart watch acquires longitude and latitude data corresponding to the current location of the smart watch via the GPS positioning module.

In S203, the smart watch sends the longitude and latitude data to the mobile terminal via Bluetooth.

The time zone data can be JavaScript® Object Notation (JSON) data. JSON is a lightweight data exchange format that is based on a subset of ECMAScript®. JSON adopts a text format that is completely independent of languages. In short, JSON refers to object and array in JavaScript®, and various complex structures can be expressed through these two structures. Wherein, the object is expressed as the content between "{ }" in JSON and has a key-value pair structure of {key: value, key: value, . . . } as the data structure. In an object-oriented language, key is the object attribute, value is a corresponding attribute value, and the method to assign a value is that the object.key acquires an attribute value. The type of the attribute value may comprise number, character string, array, and object. In JSON, an array is the content between square brackets "[ ]" and has a data structure of ["Java", "javascript", "vb", . . . ]. Just like in all languages, the method to assign a value is to acquire the value through index. The type of a field value may comprise number, character string, array, and object.

In an exemplary implementation, the network server can be a Google® server. The Google® server can be used by users for free, provides a time zone positioning service, and can acquire a time zone of a corresponding position according to the longitude and latitude data.

For major cities in the world, the relationship between longitude and latitude and time zone is as follows:

| London | 51° N 0° E UTC(0) |
|---|---|
| Paris | 48° N 2° E UTC + 1 |
| Zurich | 47° N 8° E UTC + 1 |
| Warsaw | 52° N 21° E UTC + 1 |
| Austria | 48° N 16° E UTC + 1 |
| Berlin | 48° N 16° E UTC + 1 |
| Munich | 48° N 11° E UTC + 1 |
| Amsterdam | 52° N 4° E UTC + 1 |
| Rome | 41° N 12° E UTC + 1 |
| Venice | 45° N 12° E UTC + 1 |
| Egypt | 30° N 31° E UTC + 2 |
| Athens | 37° N 23° E UTC + 2 |
| Moscow | 55° N 37° E UTC + 3 |
| Beijing | 39° N 116° E UTC + 8 |
| Hong Kong | 22° N 114° E UTC + 8 |
| Tokyo | 35° N 139° E UTC + 9 |
| Sydney | 33° S 151° E UTC + 10 |
| New York | 40° N 73° W UTC − 5 |

-continued

| | |
|---|---|
| Buenos Aires | 34° S 58° W UTC − 3 |
| Rio de Janeiro | 22° S 47° W UTC − 3 |
| Toronto | 43° N 79° W UTC − 5 |
| Houston | 42° N 71° W UTC − 5 |
| Washington | 38° N 77° W UTC − 5 |
| Los Angeles | 34° N 118° N UTC − 8 |
| San Francisco | 37° N 122° N UTC − 8 |

The mobile terminal can be, for example, a cell phone or a tablet computer. For example, if the mobile terminal is a cell phone, then the cell phone needs to have a Bluetooth-supporting time zone application. When the smart watch activates the GPS positioning module and determines a location based on the longitude and latitude of the smart watch, the smart watch end sends the longitude and latitude data to the cell phone via Bluetooth. Upon receiving the longitude and latitude data, the time zone application on the cell phone can encapsulate the longitude and latitude data according to Google Maps® Time Zone API, and then sends the longitude and latitude data to the Google® server via the Internet. Upon receiving the longitude and latitude data, the Google® server performs an analysis on the received longitude and latitude data, and returns JSON data to the cell phone. Upon receiving the JSON data, the time zone application on the cell phone parses the JSON data. If a region is identified as being on the open sea, the timeZoneName data in the JSON data is parsed to be null. Otherwise, the timeZoneName data is time zone information. The time zone information is sent to the smart watch via Bluetooth. When detecting the time zone information, a customized application on the smart watch updates the time zone information associated with the smart watch.

Figure 3:
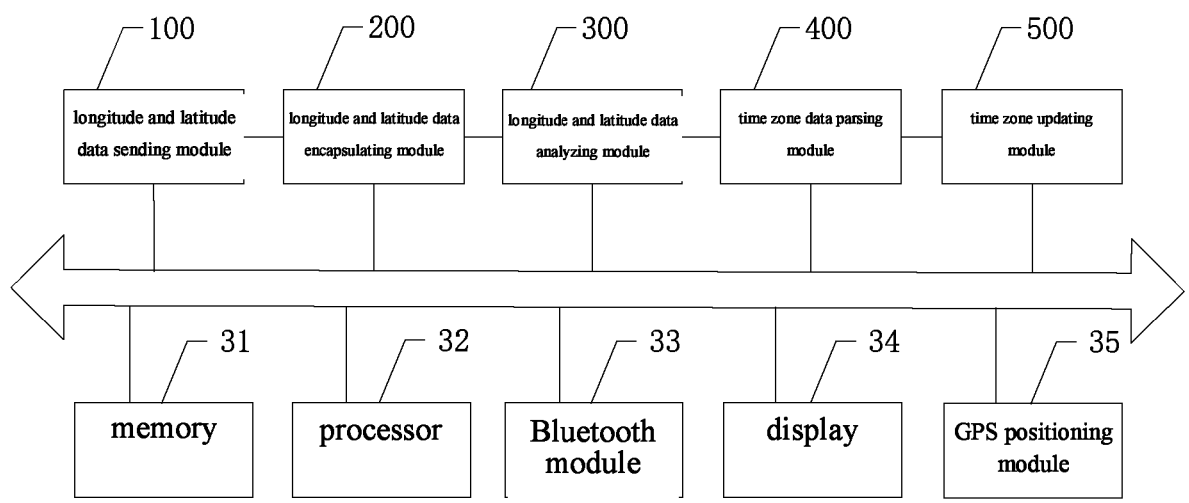
FIG. 3 is a structural block diagram of an exemplary system for automatically updating a time zone of a smart watch.

FIG. 3 is a structural block diagram of an exemplary system for automatically updating a time zone of a smart watch.

As shown in FIG. 3, a longitude and latitude data sending module 100 of the smart watch is configured to send longitude and latitude data corresponding to a current location of the smart watch to a mobile terminal via Bluetooth.

A longitude and latitude data encapsulating module 200 of the mobile terminal is configured to encapsulate the longitude and latitude data received by the mobile terminal, and send the longitude and latitude data to a network server through a network.

A longitude and latitude data analyzing module 300 of the network server is configured to analyze the longitude and latitude data received by the network server, and return time zone data to the mobile terminal.

A time zone data parsing module 400 of the mobile terminal is configured to parse the time zone data received by the mobile terminal to obtain time zone information, and send the time zone information to the smart watch via Bluetooth.

A time zone updating module 500 of the smart watch is configured to update, upon receiving the time zone information by the smart watch, information associated with the time zone corresponding to the current location of the smart watch.

A memory 31 of the mobile terminal is configured to store software programs and modules.

A processor 32 of the mobile terminal is configured to execute various functions and applications of the mobile terminal and data processing by running the software programs and modules stored in the memory 31.

A Bluetooth module 33 is configured to establish communication connection between the smart watch and the mobile terminal.

A display 34 of the smart watch is configured to display a time zone corresponding to a current location of the smart watch.

A GPS positioning module 35 of the smart watch is configured to acquire longitude and latitude data corresponding to a current location of the smart watch.

In an exemplary implementation, the processor 32 uploads executable program codes corresponding to processes of one or more applications into the memory 31. The processor 32 runs the applications stored in the memory 31, thereby carrying out the above automatic time zone updating method for a smart watch or running the above automatic time zone updating system for a smart watch, and then achieving various corresponding functions.

Figure 4:
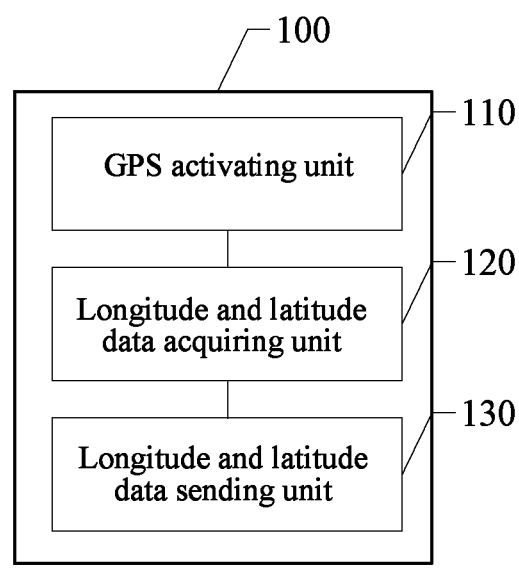
FIG. 4 is a structural block diagram further illustrating the exemplary longitude and latitude data sending module of FIG. 3.

FIG. 4 is a structural block diagram further illustrating the exemplary longitude and latitude data sending module 100 of FIG. 3.

The longitude and latitude data sending module 100 includes a GPS activating unit 110 configured to activate GPS positioning module of the smart watch, as described above.

The longitude and latitude data sending module 100 includes a longitude and latitude data acquiring unit 120 configured to acquire longitude and latitude data of the smart watch through the GPS positioning module.

The longitude and latitude data sending module 100 further includes a longitude and latitude data sending unit 130 configured to send the longitude and latitude data to the mobile terminal via Bluetooth.

As described above, the network server can be a Google® server. Technical details regarding the modules and units above have been described in detail in the method above, which will not be repeated herein.

Those skilled in the art should understand that all or a part of the above-described exemplary can be implemented through relevant hardware as instructed by computer program instructions, and the computer program may be stored in a computer readable storage medium. The storage medium therein may be magnetic disk, optical disk, Read Only Memory (ROM) or Random Access Memory (RAM).

In summary, an exemplary smart watch determines its own current location based on it longitude and latitude, then sends the acquired longitude and latitude data to a mobile terminal. The mobile terminal sends the longitude and latitude data to a network server that obtains time zone data and then returns the time zone data to the mobile terminal. Time zone information is thereby obtained, and the smart watch is updated. Thus, even in the case where a mobile terminal is unable to learn the current time zone, it can still acquire, in real time, the time zone information for updating, thereby greatly facilitating the use by a user and adding a new function to smart watches.

It should be understood that applications of the present invention are not limited to the examples above. Those skilled in the art can make improvements or changes according to the description above, and all these improvements and changes shall be encompassed by the appended claims.

The invention claimed is:

1. A method for automatically updating a current time zone of a smart watch, the method comprising:
   determining, via the smart watch, longitude and latitude data corresponding to a current location of the smart watch;

sending, via the smart watch, the longitude and latitude data to a mobile terminal that encapsulates the longitude and latitude data and sends the longitude and latitude data to a network server that analyzes the received longitude and latitude data and returns time zone data to the mobile terminal, where the mobile terminal parses the time zone data to obtain time zone information and simultaneously sends the time zone information to the smart watch and updates time zone information of the mobile terminal; and updating the current time zone of the smart watch based on the time zone information sent from the mobile terminal.

2. The method according to claim 1, further comprising:
connecting the smart watch and the mobile terminal via Bluetooth before the sending the longitude and latitude data.

3. The method according to claim 1, wherein the determining longitude and latitude data further comprises:
activating a GPS positioning module of the smart watch;
acquiring, via the GPS positioning module, real-time longitude and latitude data corresponding to the current location of the smart watch; and
sending, via the smart watch, the longitude and latitude data to the mobile terminal.

4. The method according to claim 3, wherein the GPS positioning module is a GPS positioning chip.

5. The automatic time zone updating method according to claim 1, further comprising:
determining via the network server that the time zone data is null when the current location of the smart watch is determined, based on the longitude and latitude data, to be a region on the open sea.

6. The method according to claim 1, wherein the time zone data is JavaScript® Object Notation (JSON) data.

7. A method for automatically updating a current time zone of a smart watch, the method comprising:
determining, via the smart watch, longitude and latitude data corresponding to a current location of the smart watch;
sending, via the smart watch, the longitude and latitude data to a mobile terminal that encapsulates the longitude and latitude data and sends the longitude and latitude data to a network server that analyzes the received longitude and latitude data and returns time zone data to the mobile terminal, where the mobile terminal parses the time zone data to obtain time zone information; and
updating the current time zone of the smart watch based on the time zone information sent from the mobile terminal.

8. The method according to claim 7, wherein the time zone data is JavaScript® Object Notation (JSON) data.

9. The method according to claim 7, further comprising:
connecting the smart watch and the mobile terminal via Bluetooth.

10. The method according to claim 7, wherein the determining longitude and latitude data further comprises:
activating a GPS positioning module of the smart watch;
acquiring, via the GPS positioning module, the longitude and latitude data; and
sending, via the smart watch, the longitude and latitude data to the mobile terminal.

11. The method according to claim 10, wherein the GPS positioning module is a GPS positioning chip.

12. The method according to claim 7, further comprising:
determining via the network server that the time zone data is null when the current location of the smart watch is determined, based on the longitude and latitude data, to be a region on the open sea.

13. The method according to claim 7, wherein the mobile terminal simultaneously sends the time zone information to the smart watch and updates time zone information of the mobile terminal.

14. A smart watch comprising:
a processor; and
a memory that stores at least one instruction that when executed by the processor, causes the processor to:
determine longitude and latitude data corresponding to a current location of the smart watch;
send the longitude and latitude data to a mobile terminal that encapsulates the longitude and latitude data and sends the longitude and latitude data to a network server that analyzes the received longitude and latitude data and returns time zone data to the mobile terminal, where the mobile terminal parses the time zone data to obtain time zone information and simultaneously sends the time zone information to the smart watch and updates time zone information of the mobile terminal; and
update the current time zone of the smart watch based on the time zone information sent from the mobile terminal.

15. The smart watch according to claim 14, wherein the time zone data is JavaScript® Object Notation (JSON) data.

16. The smart watch according to claim 14, wherein the memory further stores at least one instruction that when executed by the processor, causes the processor to:
connect the smart watch with the mobile terminal via Bluetooth.

17. The smart watch according to claim 14, wherein the memory further stores at least one instruction that when executed by the processor, causes the processor to:
activate a GPS positioning module;
acquire, via the GPS positioning unit, the longitude and latitude data; and
send the longitude and latitude data to mobile terminal.

18. The smart watch according to claim 17, wherein the GPS positioning module is a GPS positioning chip.

19. The smart watch according to claim 14, wherein the memory further stores at least one instructions that when executed by the processor, causes the processor to:
update the current time zone of the smart watch with a null value when the current location of the smart watch is determined to be a region on the open sea.

20. The smart watch according to claim 14, wherein the mobile terminal simultaneously sends the time zone information to the smart watch and updates time zone information of the mobile terminal.

* * * * *